Patented Mar. 10, 1953

2,631,136

UNITED STATES PATENT OFFICE 2,631,136

PREPARATION OF AN ALUMINA-HALOGEN-PLATINUM CATALYST

Vladimir Haensel, Hinsdale, Ill., assignor to Universal Oil Products Company, Chicago, Ill., a corporation of Delaware No Drawing. Application July 8, 1949, Serial No. 103,746

6 Claims. (Cl. 252—442)

This invention relates to the manufacture and use of catalysts and more particularly to the manufacture and use of platinum-containing catalysts prepared by a specific method of procedure.

Platinum-containing catalysts and various methods of manufacturing the same have heretofore been suggested. These catalysts have been of limited commercial acceptance because of the high cost thereof. The present invention is based on the discovery that exceptionally good catalysts may be prepared by specific methods of preparation to be hereinafter described in detail.

In one embodiment the present invention relates to a method of preparing a catalyst which comprises commingling a platinum compound, a halogen and ammonium hydroxide, thereby forming an insoluble precipitate, heating the resultant mixture at an elevated temperature to dissolve the precipitate and thereby form a clear solution, and compositing said solution with alumina.

In a specific embodiment the present invention relates to a method of preparing a catalyst which comprises commingling chloroplatinic acid, hydrogen fluoride and ammonium hydroxide, thereby forming an insoluble precipitate, heating the resultant mixture to dissolve the precipitate and thereby to form a clear solution, and compositing said solution with previously formed particles of synthetically precipitated alumina.

In still another embodiment the present invention relates to the use of catalysts prepared in the manner herein set forth for the conversion of organic compounds and more particularly for the reforming of gasoline.

It has been found that exceptionally good catalysts are prepared in accordance with the novel features of the present invention. While these catalysts may contain larger concentrations of platinum, which may range up to about 10% by weight or more of the alumina, it has been found that exceptionally good catalysts may be prepared to contain as low as from about 0.01% to about 1% by weight of platinum. Catalysts of these low platinum concentrations are particularly preferred in the present invention because of the considerably lower cost of the catalyst. It is well known that platinum is very expensive and any satisfactory method of reducing the amount of platinum required in catalysts considerably reduces the cost of the catalyst and thus enhances the attractiveness of the catalyst for use in commercial processes.

However, in order to obtain the improved results with these low platinum concentrations, it is necessary that a particular type of supporting component be composited with the platinum. It has been found that alumina shows unexpected advantages for use as a supporting component for the low platinum concentrations, apparently due to some peculiar association of the alumina with the platinum, either as a chemical combination or as a physical association.

To further improve these catalysts, it is an essential feature of the present invention that the final catalyst contains halogen in a specific concentration. It has been found that the presence of halogen within a specific range enhances the activity of the catalyst. It is believed that the halogen enters into a chemical combination or loose complex with the alumina and/or platinum, and thereby serves to further improve the final catalyst.

While any of the halogens will serve to effect improved results, the fluoride is preferred. Next in order is the chloride, while the bromide and iodide are generally less preferred. It is understood that, while all of these halogens will serve to effect an improvement, they are not necessarily equivalent.

As hereinabove set forth, the catalyst of the present invention comprises alumina, platinum and halogen. In a preferred embodiment the alumina comprises precipitated alumina which is washed thoroughly to remove undesirable impurities and then the other components are commingled with the alumina. It has been found that the presence of ammonium hydroxide serves to uniformly distribute the platinum throughout the alumina and thereby results in an improved catalyst. On the other hand, in the absence of the ammonium hydroxide, the platinum is unevenly distributed on the alumina and thereby results in an unsatisfactory catalyst. It appears necessary for the platinum to occupy a particular spacial arrangement with respect to the alumina and halogen and the desired spacial arrangement is not obtained when the platinum atoms are grouped too closely together or are spaced at too great a distance apart. The ammonium hydroxide serves to obtain the desired arrangement.

As will be hereinafter described in detail, a preferred method of manufacturing the catalyst entails the use of chloroplatinic acid and hydrogen fluoride. A simplification in the manufacture of the catalyst is obtained when the chloroplatinic acid, hydrogen fluoride and ammonium hydroxide may be prepared as a separate solution and this separate solution then commingled with the alumina. However, when such a mixture of chloroplatinic acid, hydrogen fluoride and ammonium hydroxide is prepared, an insoluble precipitate of ammonium chloroplatinate settles out. Attempts to use this mixture containing the insoluble precipitate to impregnate alumina has resulted in unsatisfactory catalysts for the reasons as explained hereinbefore. It has now been found, and is an essential feature of the present invention, that this mixture containing the insoluble precipitate may be heated to an elevated temperature which serves to dissolve the insoluble precipitate and to form a clear solution, and to use this clear solution as a source of these components for compositing with the alumina.

Any suitable alumina may be used in preparing the catalyst of the present invention and, as hereinbefore set forth, preferably comprises precipitated alumina. The precipitated alumina is readily obtained by the addition of a suitable reagent, such as ammonium hydroxide, ammonium carbonate, etc. to a salt of aluminum such as aluminum chloride, aluminum sulfate, aluminum nitrate, etc. in an amount to form aluminum hydroxide which upon drying is converted to alumina and, in the interest of simplicity, the aluminum hydroxide is referred to as alumina in the present specification and claims in order that the percentages are based on alumina free of combined water. It has been found that aluminum chloride is generally preferred as the aluminum salt, not only for convenience in subsequent washing and filtering procedures, but also because it appears to give best results. Alumina may also be prepared by the reaction of sodium aluminate with aluminum chloride or other suitable aluminum salt.

After the alumina has been formed, it is generally washed to remove soluble impurities. Usual washing procedures comprise washing with water, either in combination with filtration or as separate steps. It has been found that filtration of the alumina is improved when the wash water includes a small amount of ammonium hydroxide. The washing should be of sufficient severity to substantially completely remove all soluble impurities because it has been found that the presence of impurities has a deleterious effect on the activity of the catalyst. A particularly preferred method is to utilize substantially pure aluminum chloride in the preparation of the alumina and to likewise use purified water or other reagents in preparing the catalyst so as not to introduce impurities into the catalyst from these sources.

Alumina prepared in the above manner, after washing and filtration, is generally recovered as a wet cake. In one embodiment of the invention the wet cake, either with or without being made into a slurry with water, is commingled with the solution of platinum compound, halogen and ammonium hydroxide. In another embodiment the alumina is dried, formed into particles of uniform or irregular size and shape and calcined prior to commingling of the solution of other components. Details as to the drying and calcining procedures will be hereinafter set forth.

As hereinbefore set forth, chloroplatinic acid is the preferred source of platinum because of its ready availability and general lower cost. However, it is understood that the novel features of the present invention are applicable to the use of any suitable soluble platinum compound which forms the insoluble precipitate in the presence of halogen and ammonium hydroxide and which may be dissolved upon heating. As hereinbefore set forth the amount of platinum containing solution utilized is such that the final catalyst will contain from about 0.01% to about .1% by weight of platinum.

Any suitable source of halogen may be utilized in accordance with the present invention but the halogen should be in the form which will readily react with the alumina and also one that will not leave undesirable deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handling and for control of the specific amount to be added.

The concentration of halogen in the finished catalyst will be within the range of from about 0.1% to about 8% by weight of the alumina on a dry basis. The fluoride appears to be more active and therefore will be used within the range of from about 0.1% to about 3% by weight of the alumina on a dry basis. The chloride will be used within the range of from about 0.1% to about 8% and preferably from about 0.3% to about 5% by weight of the alumina on a dry basis. It has been found that halogen concentrations below these lower limits do not give the desired improvement and, on the other hand, concentrations of halogen above the upper limits adversely affect the selectivity of the catalyst, thus catalyzing side reactions to an extent greater than desired.

As hereinbefore set forth, a separate solution of platinum compound, halogen and ammonium hydroxide is prepared, this mixture containing an insoluble precipitate. In accordance with the present invention, this mixture is heated at an elevated temperature, which generally will be within the range of from about 100° F. to about 212° F. at atmospheric pressure or at a higher temperature when superatmospheric pressure is employed, and this serves to dissolve the precipitate and thereby to form a clear solution. The solution may be commingled with the alumina in any suitable manner. When it is to be commingled with the alumina while the latter is in a wet condition, this may be readily accomplished by adding the solution to the alumina and thoroughly mixing the same in order to obtain even distribution of the solution throughout the alumina. Excess solution may be removed in any suitable manner and the products are then dried and calcined in the manner to be hereinafter set forth. It is understood that the quantity of solution will be regulated so that the final catalyst contains the concentrations of platinum and halogen as hereinbefore set forth.

When the solution is to be commingled with the alumina after the latter has been dried, formed into particles of definite size and shape and calcined, this may be accomplished in a number of suitable methods. In one method the alumina particles are soaked in the solution and excess solution removed by draining or by heating to remove volatile materials. Other suitable methods include those in which the solution is poured over the alumina particles or in which the alumina particles are dipped in the solution. In any event sufficient time is allowed so that uniform distribution of platinum and halogen throughout the alumina is obtained.

As hereinbefore set forth, the solution may be commingled with the alumina before or after the latter has been formed into particles of definite size and shape. When the alumina is to be formed into particles of definite size and shape prior to commingling with the solution, the wet alumina cake is dried at a temperature of from about 200° to 500° F. or more for a period of from about 2 to 24 hours or more. The dried material is then ground and, when particles of irregular size and shape are desired, the ground material is calcined at a temperature of from about 800° to about 1400° F. for a period of from about 2 to 12 hours or more. When particles of uniform size and shape are desired, a suitable lubricant such as stearic acid, rosin, hydrogenated coconut oil, graphite, etc. is added and the alumina is formed into particles of uniform size shape in any suitable method such as by pelleting, extrusion, etc. The particles then may be calcined at a temperature of from about 800° to about 1400° F. for a period of from about 2 to 12 hours or more.

On the other hand, when the solution is added to the alumina before the latter has been formed into particles of uniform size and shape, the composite is dried at a temperature of from about 200° to 500° F. or more for a period of from about 2 to 24 hours or more and may be formed into particles of uniform or irregular size and shape in the manner as hereinbefore set forth and then is calcined. However, after the platinum has been composited with the alumina, the composite is calcined at a temperature not to exceed about 1100° F. and, therefore, the calcination temperature will generally be within the range of from about 700° to about 1100° F. for a period of from about 2 to 12 hours or more. The calcination is preferably effected in the presence of air or other oxygen-containing gas. In another embodiment of the invention, the calcination may comprise a two-stage method in which it is first conducted in the presence of hydrogen and then is followed by calcination in air, or the reverse procedure may be employed. In some cases the reduction with hydrogen or hydrogen-containing gas may be effected at a lower temperature within the range of from about 300° to about 600° F.

In some cases the lubricant will be removed during the high temperature heating. In other cases, as for example, when graphite is used as the lubricant, the separate high temperature heating may be omitted, and the effective heat treatment of the catalyst may be obtained in the plant before or during processing of the hydrocarbons.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 1100° F. In some cases it may be desirable to follow the burning operation with treatment with hydrogen-containing gas at temperatures of from about 700° to about 1100° F.

The improved catalyst of the present invention may be employed in any process for which platinum is a catalyst. The catalyst is particularly satisfactory for reforming operations in which a saturated gasoline, such as straight run gasoline, natural gasoline, etc. is subjected to conversion to produce a reformed gasoline of improved anti-knock properties. Saturated gasoline generally comprises a mixture of naphthenic and paraffinic hydrocarbons, and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and converts higher boiling fractions to lower boiling fractions within the range of gasoline. However, this cracking must be controlled because excessive cracking produces excessive normally gaseous products and also excessive carbonaceous deposits on and deactivation of the catalyst. The improved catalysts of the present invention are particularly desirable for reforming operations because the catalyst effects the desired aromatization and controlled cracking under selected conditions of operation.

It is understood that the gasoline may comprise a full boiling range gasoline or any selected fraction thereof, and reference to gasoline in the present specification and claims shall mean the full boiling range gasoline or any selected fraction thereof.

The catalyst of the present invention may also find utility in treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction or fractions.

The catalyst of the present invention may prove particularly useful for destructive hydrogenation of hydrocracking reactions in which hydrocarbons and particularly oil heavier than gasoline are subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting non-destructive hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of these catalysts. In reactions involving hydrogenation, oxidation or condensation, it is preferred that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 600° to about 1000° F., the pressure within the range of from about 50 to about 1000 pounds per square inch and the weight hourly space velocity within the range of from about 0.5 to about 10. For dehydrogenation of normal butane the temperature should be within the range of from about 800° to about 1100° F., the pressure from about atmospheric to about 50 pounds per square inch and the gaseous hourly space velocity from about 200 to about 5000. For hydrogenation reactions the temperature may range from atmospheric to about 500° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, the suspensoid type of operation in which the catalyst is carried into the reaction zone as a slurry in the hydrocarbon oil, and the fluidized-fixed bed type of process in which the reaction is effected in substantially the same manner as described for the fluidized type process except that the catalyst is substantially retained in the reaction zone.

The following example is introduced to illustrate further the novelty and utility of the present invention, but not with the intention of unduly limiting the same.

A preferred catalyst of the present invention may be prepared to comprise alumina, 0.3% by weight of platinum and 0.3% by weight of combined fluorine. The catalyst may be prepared by adding ammonium hydroxide to aluminum chloride in amount to form aluminum hydroxide. The aluminum hydroxide is thoroughly washed, preferably with water containing ammonium hydroxide, and is filtered after each wash. The wet cake recovered from the last wash is dried at a temperature of about 350° F. for about 8 hours. The dried alumina is ground and stearic acid added as a lubricant. The composite is then formed into pills of uniform size and shape in a pelleting operation, and the pills are calcined at a temperature of 932° F. for a period of 4 hours.

A solution of chloroplatinic acid, hydrogen fluoride and ammonium hydroxide is prepared as follows: An aqueous solution of chloroplatinic acid is prepared to contain the desired amount of platinum. Similarly, an aqueous solution of hydrogen fluoride is prepared to contain the desired amount of combined fluorine. These solutions are commingled, resulting in a solution having a pH of below about 5. An aqueous solution of ammonium hydroxide is prepared, and this solution is added to the solution of chloroplatinic acid and hydrogen fluoride in an amount sufficient to raise the pH of the final solution to above about 7. Upon the addition of the ammonium hydroxide, an insoluble precipitate will form and settle from the solution. This mixture is then heated at a temperature of 175° F. and the insoluble precipitate will dissolve and thereby result in a clear solution.

The solution thus formed is commingled with the previously prepared alumina particles by soaking the alumina particles in a bath of the solution for a period of 2 hours. Thereafter the mixture is heated at a temperature of about 200° F. for a sufficient time to remove volatile components. The pills are then dried at a temperature of 350° F. for 8 hours and finally calcined in a stream of air at a temperature of 932° F. for 5 hours.

The catalyst as prepared in the above manner may be utilized for the reforming of straight run gasoline at a temperature of 875° F., a pressure of 700 pounds per square inch, a space velocity of 2 and a hydrogen to hydrocarbon ratio of 3 to 1. This operation will produce over 90% by volume of a reformate having a high octane number.

I claim as my invention:

1. A method of preparing a catalyst which comprises commingling aqueous solutions of a platinum compound, a hydrogen halide and ammonium hydroxide, the amount of the ammonium hydroxide being sufficient to raise the pH of the mixed solution to above 7, thereby forming a precipitate, heating the resultant mixture sufficiently to dissolve said precipitate and form a clear solution, commingling said clear solution with alumina in an amount to form a final catalyst containing from about 0.01% to about 10% by weight of platinum and from about 0.1% to about 8% by weight of combined halogen, and calcining the resultant composite.

2. The process of claim 1 further characterized in that said platinum compound is chloroplatinic acid.

3. A method of preparing a catalyst which comprises commingling aqueous solutions of chloroplatinic acid, hydrogen fluoride and ammonium hydroxide, the amount of the ammonium hydroxide being sufficient to raise the pH of the mixed solution to above 7, thereby forming a precipitate, heating the resultant mixture sufficiently to dissolve said precipitate and form a clear solution, commingling said clear solution with alumina in an amount to form a final catalyst containing from about 0.01% to about 10% by weight of platinum and from about 0.1% to about 8% by weight of combined halogen, and calcining the resultant composite.

4. The method of claim 3 further characterized in that said alumina is in the form of shaped and calcined particles.

5. A method of preparing a catalyst which comprises commingling aqueous solutions of chloroplatinic acid and hydrogen fluoride to form a mixed solution having a pH below about 5, adding to the mixed solution a sufficient amount of ammonium hydroxide to raise the pH value to above 7, thereby forming a precipitate, heating the resultant mixture sufficiently to dissolve said precipitate and form a clear solution, commingling said clear solution with alumina in an amount to form a final catalyst containing from about 0.01% to about 10% by weight of platinum and from about 0.1% to about 8% by weight of combined halogen, and calcining the resultant composite.

6. A method of preparing a catalyst which comprises commingling aqueous solutions of a platinum compound and a hydrogen halide to form a mixed solution having a pH below about 5, adding to the mixed solution a sufficient amount of ammonium hydroxide to raise the pH value to above 7, thereby forming a precipitate, heating the resultant mixture sufficiently to dissolve said precipitate and form a clear solution, commingling said clear solution with alumina in an amount to form a final catalyst containing from about 0.01% to about 10% by weight of platinum and from about 0.1% to about 8% by weight of combined halogen, and calcining the resultant composite.

VLADIMIR HAENSEL.

REFERENCES CITED

The following references are of record in the file of this patent:

UNITED STATES PATENTS

| Number | Name | Date |
|---|---|---|
| 2,005,412 | Connolly et al. | June 18, 1935 |
| 2,200,522 | Streicher | May 14, 1940 |
| 2,461,959 | Brandon | Feb. 15, 1949 |
| 2,479,109 | Haensel | Aug. 16, 1949 |
| 2,479,110 | Haensel | Aug. 16, 1949 |